(No Model.)

L. HARRIS.
VEHICLE WHEEL BOX.

No. 474,245. Patented May 3, 1892.

Witnesses
Clar. A. Williams,
Newton G. Leslie.

Inventor
Levi Harris
By his Attorney Lucius C. West

UNITED STATES PATENT OFFICE.

LEVI HARRIS, OF KALAMAZOO, MICHIGAN, ASSIGNOR OF ONE-HALF TO OSCAR M. ALLEN, SR., OF SAME PLACE.

VEHICLE-WHEEL BOX.

SPECIFICATION forming part of Letters Patent No. 474,245, dated May 3, 1892.

Application filed February 15, 1892. Serial No. 421,573. (No model.)

*To all whom it may concern:*

Be it known that I, LEVI HARRIS, a citizen of the United States, residing at Kalamazoo, county of Kalamazoo, State of Michigan, have invented a new and useful Vehicle-Wheel Box and Axle, of which the following is a specification.

My invention refers to that class of constructions in which the design has been to obviate end chucking and rattling of the wheel without the use of the ordinary washers, such as leather and the like.

The object of my invention is to prevent said end chucking or rattling without the use of said ordinary washers by the construction substantially as below described and claimed.

Figure 1:
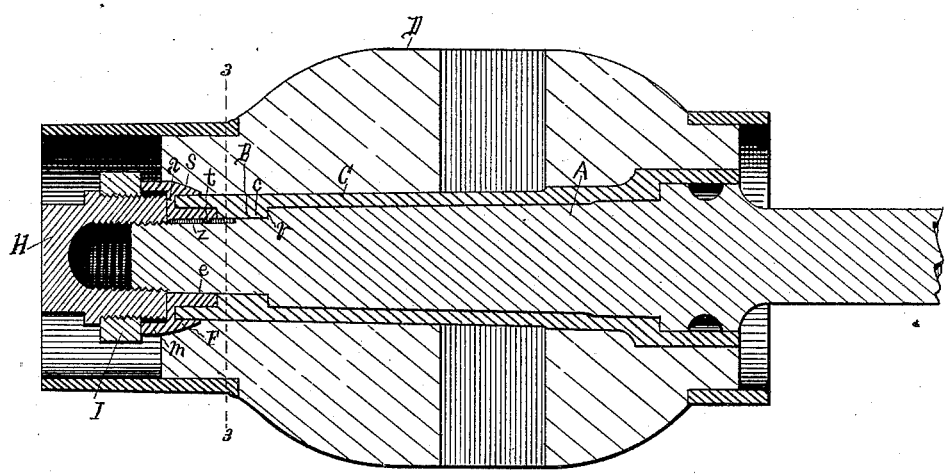
Figure 2:
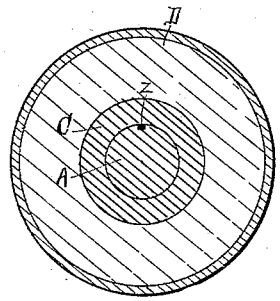

In the drawings forming a part of this specification, Figure 1 is a longitudinal section of the wheel hub and axle; and Fig. 2 is a cross-section on line 3 3 in Fig. 1, looking from a point at the left.

Referring to the lettered parts of the drawings, A represents the ordinary construction of a vehicle-axle, with the exception that it is tenoned at the forward end, as at B in Fig. 1, the free end of said tenoned portion being screw-threaded.

At C is shown the box of the wheel-hub D, the interior of said box near its outer end being provided with a peripheral rib $c$. In this construction I employ a peculiarly-shaped metal washer F, which washer has a rearwardly-extending portion $e$, at right angles to the body proper $a$ of the washer, so formed that when the washer is in place in the end of the box C a proper space will be left between its end and the shoulder $v$ of the tenoned end of the axle A to receive the internal rib $c$ of the box C, as clearly shown in Fig. 1. This washer also has a flange $s$ surrounding the outer end of the box C, there being a sufficient space between the said flange and the outer periphery of the box to allow said box to revolve with the hub, and there is also a space between the interior of the box and the outer periphery of said rearwardly-extending portion $e$, these parts being so arranged that the box revolves with the wheel free and independent of said washer. The washer F also has a circular flange $m$ extending outward from the body $a$ of the washer F in an opposite direction from the flange $s$.

The tenoned end of the axle A is provided with a longitudinal groove $z$, and the washer F is provided with a projection $t$, which is inserted into said groove $z$ when the washer is placed on the axle, and thus prevents said washer from turning.

In Fig. 1 is shown a nut H, internally threaded, so as to be screwed onto the threaded portion of the tenoned end of the axle A sufficiently close against the body $a$ of the washer F to prevent the wheel from chucking endwise. The exterior periphery of the inner end of the nut H is screw-threaded. The supplemental nut I is screwed onto the exterior threaded portion of the nut H, which nut I is employed in taking up the wear of the wheel and axle to prevent end chucking, thus dispensing with all washers of leather or otherwise ordinarily employed for said purpose. It will thus be readily seen that any end wear of the shoulders of the axle-box and washer can be quickly and readily taken up by tightening the supplemental nut I sufficiently close against the flange $m$ of the washer for that purpose without changing the position of the nut H which holds the wheel on. It will be observed that in taking off the nut H to remove the wheel said nut H and the supplemental nut I are not separated. By constructing the tenoned end of the axle A and the washer F and providing the box C with the internal rib B in the manner before described all of the end wear does not come upon the rear shoulders of the axle and box.

Having thus described my invention, what I claim as new, and desire to secure by Letters Patent of the United States, is—

The combination of a vehicle-axle having the tenoned end and the box of a wheel, the interior of which is provided near its outer end with an interior peripheral rib, the washer provided with the two inwardly-extending flanges, one outside and the other inside of the free end of the box of the wheel, the inner flange being of such a length that a circular groove will be established to receive the interior rib of the box, said washer being interlocked with the axle, so as not to turn with the wheel, a nut for holding on the wheel screw-threaded onto the end of the axle and against the body of said washer, and the supplemental nut screw-threaded onto said wheel-holding nut in a manner to be adjusted against the washer to take up the end wear, substantially as set forth.

In testimony to the foregoing I have hereunto subscribed my name in the presence of two witnesses.

LEVI HARRIS.

Witnesses:
P. W. ARVIDSON,
GEO. H. BOLLES.